(12) United States Patent
Erbes et al.

(10) Patent No.: US 6,394,765 B1
(45) Date of Patent: May 28, 2002

(54) JET PUMP SLIP JOINT CLAMP APPARATUS

(75) Inventors: John Geddes Erbes, Mountain View; Martin Rudy Torres, San Jose, both of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/691,363

(22) Filed: Oct. 18, 2000

(51) Int. Cl.[7] ................................................. F04B 17/00
(52) U.S. Cl. ..................................... 417/360; 248/230.6
(58) Field of Search .................. 417/360, 151, 417/63; 248/316.7, 229.15, 230.6, 62, 67.5, 73, 74.4; 376/260

(56) References Cited

U.S. PATENT DOCUMENTS

| | | | | |
|---|---|---|---|---|
| 4,675,149 A | * | 6/1987 | Perry et al. ................. | 376/260 |
| 4,787,591 A | * | 11/1988 | Villacorta ................. | 248/316.7 |
| 4,828,210 A | * | 5/1989 | Anderson et al. ...... | 248/229.15 |
| 5,752,807 A | * | 5/1998 | Erbes ......................... | 417/63 |
| 5,971,334 A | * | 10/1999 | Crawshaw et al. ...... | 248/230.6 |
| 5,978,433 A | | 11/1999 | Erbes et al. | |
| 6,052,425 A | | 4/2000 | Erbes et al. | |

* cited by examiner

Primary Examiner—Teresa Walberg
Assistant Examiner—Quang Van
(74) Attorney, Agent, or Firm—Armstrong Teasdale LLP

(57) ABSTRACT

A clamp apparatus for a jet pump slip joint in a boiling water nuclear reactor pressure vessel includes a C-yoke having an arcuate main portion, an engagement portion extending from a first end of the main portion, and a locking preload portion extending from a second end of the main portion. The engagement portion includes an engagement slot configured to receive a diffuser guide ear. The locking portion includes a threaded clamp bolt opening extending therethrough, and a clamp bolt threadedly engaging and extending through the clamp bolt opening. The clamp bolt includes a locking collar and a plurality of ratchet teeth spaced around the periphery of the locking collar. A locking spring engages the ratchet teeth of the clamp bolt to lock the clamp bolt in place and prevent the bolt from loosening.

19 Claims, 4 Drawing Sheets

JET PUMP SLIP JOINT CLAMP APPARATUS

BACKGROUND OF THE INVENTION

This invention relates generally to nuclear reactors, and more particularly to jet pump slip joint clamp apparatus for boiling water nuclear reactors.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus, provide the required reactor core water flow. The upper portion of the jet pump, known as the inlet mixer, is laterally positioned and supported against two opposing rigid contacts within restrainer brackets by a gravity actuated wedge. The restrainer brackets support the inlet mixer by attaching to the adjacent jet pump riser pipe. The lower portion of the jet pump, known as the diffuser, is coupled to the inlet mixer by a slip joint. The slip joint between the jet pump inlet mixer and the jet pump diffuser collar has about 0.015 inch diametral operating clearance which accommodates the relative axial thermal expansion movement between the upper and lower parts of the jet pump and permits leakage flow from the driving pressure inside the pump.

Excessive leakage flow can cause oscillating motion in the slip joint, which is a source of detrimental vibration excitation in the jet pump assembly. The slip joint leakage rate can increase due to single loop operation, increased core flow, or jet pump crud deposition. The restrainer bracket laterally supports the inlet mixer through three point contact provided by two set screws and the inlet mixer wedge at an elevation above the slip joint. Set screw gaps can occur during plant operation. Sometimes, the inlet mixer appears to settle to a position away from the set screw, while in other cases, wear occurs between the mixer wedge and the restrainer pad. In both cases, three point contact is lost and the potential for vibration is significantly increased. Set screw gaps are affected by the difference in thermal and pressure displacements of the shroud, pressure vessel, and rotation of the shroud support plate. In addition to affecting set screw gaps, thermal and pressure displacements of the shroud and the pressure vessel can diminish alignment interaction loads in the jet pump assembly which are beneficial in restraining vibration, such as a lateral force in the slip joint. The resultant increased vibration levels and corresponding vibration loads on the piping and supports can cause jet pump component degradation from wear and fatigue.

High levels of flow induced vibration (FIV) are possible in some jet pump designs at some abnormal operational conditions having increased leakage rates. Therefore, it is desirable to provide a jet pump assembly that that has a lateral load in the slip joint area to maintain rigid contact between the inlet mixer and diffuser collar to prevent oscillating motion and suppress FIV.

BRIEF SUMMARY OF THE INVENTION

In an exemplary embodiment, a clamp apparatus for a jet pump slip joint in a boiling water nuclear reactor pressure vessel includes a C-yoke. The C-yoke includes an arcuate main portion, an engagement portion extending from a first end of the main portion, and a locking preload portion extending from a second end of the main portion.

The engagement portion includes an engagement slot configured to receive a diffuser guide ear, and transmit a clamp preload force onto the jet pump diffuser. The locking preload portion includes a threaded clamp bolt opening extending therethrough, and a clamp bolt threadedly engaging and extending through the clamp bolt opening. The clamp bolt is configured to engage an outer surface of the inlet mixer and includes a locking collar having a plurality of ratchet teeth spaced around the periphery of the locking collar. A hexagonal drive extension extends through the locking collar. The hexagonal drive extension is used to tighten the clamp bolt to apply a predetermined preload to the jet pump diffuser. A locking spring is coupled to a surface of the locking portion adjacent the bolt opening. The locking spring engages the ratchet teeth of the locking collar to lock the clamp bolt in place and prevent the bolt from loosening.

The above described clamp apparatus provides a lateral load in the slip joint area of a jet pump to maintain a tight and rigid contact between the inlet mixer and diffuser to prevent oscillating motion and suppress FIV. The clamp apparatus is remotely installable, requires minimum installation time, and does not require disassembly of the jet pumps.

DETAILED DESCRIPTION OF THE INVENTION

Figure 1:
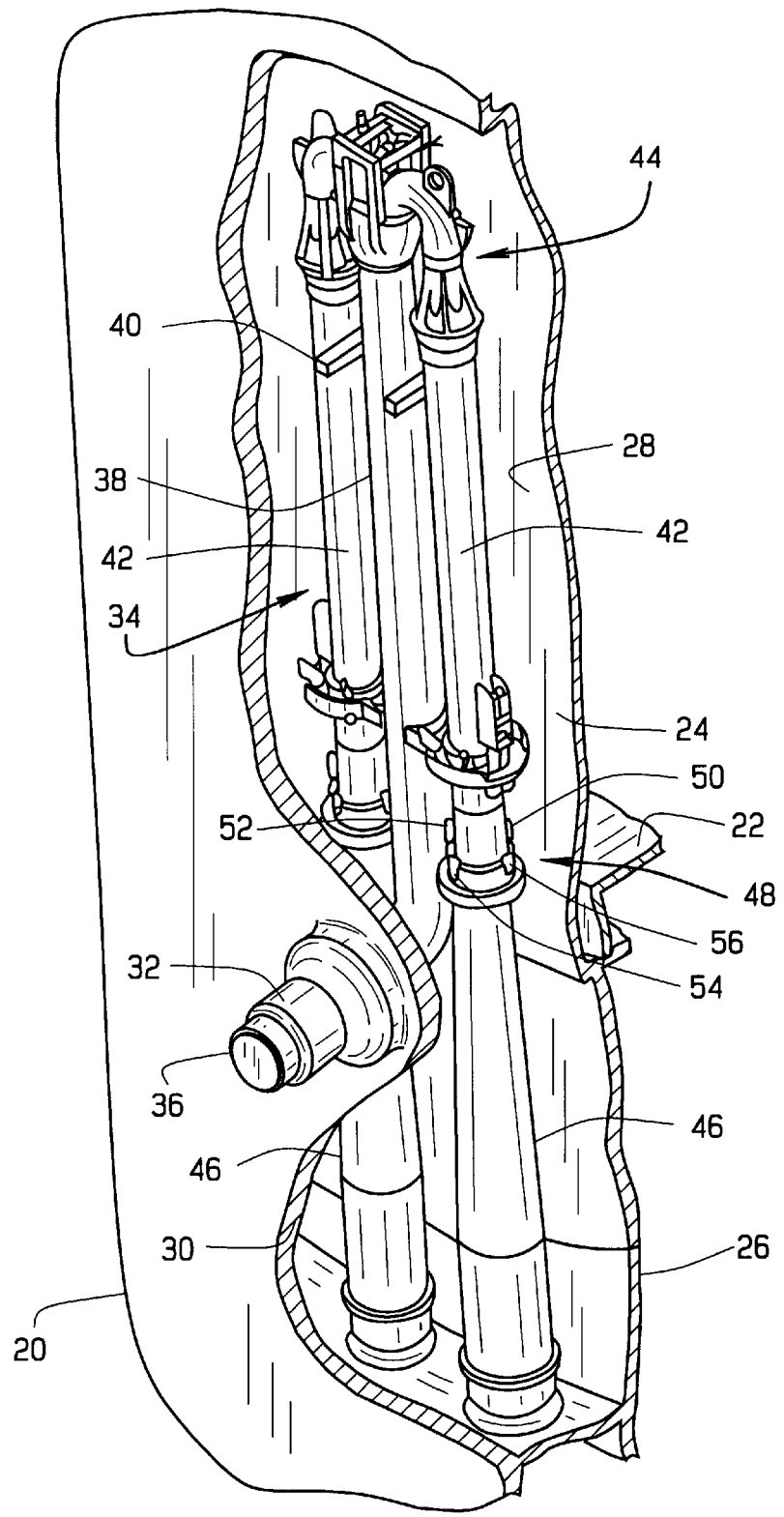
FIG. 1 is schematic, partial sectional view, with parts cut away, of a reactor pressure vessel of a boiling water nuclear reactor.

FIG. 1 is a schematic, partial sectional view, with parts cut-away, of a reactor pressure vessel (RPV) 20 for a boiling water reactor. RPV 20 has a generally cylindrical shape and is closed at one end by a bottom head and at its other end by removable top head (not shown). A top guide (not shown) is spaced above a core plate 22 within RPV 20. A shroud 24 surrounds core plate 22 and is supported by a shroud support structure 26. An annulus 28 is formed between shroud 24 and side wall 30 of RPV 20.

An inlet nozzle 32 extends through side wall 30 of RPV 20 and is coupled to a jet pump assembly 34. Jet pump assembly 34 includes a thermal sleeve 36 which extends through nozzle 32, a lower elbow (only partially visible in FIG. 1), and a riser pipe 38. Riser pipe 38 extends between and substantially parallel to shroud 24 and RPV side wall 30. A riser brace 40 stabilizes riser pipe 38 within RPV 20.

Jet pump assembly 34 also includes inlet mixers 42 connected to riser pipe 38 by transition assembly 44. Inlet mixers 42 are coupled to corresponding diffusers 46 by slip joints 48. Each diffuser 46 includes guide ears 50, 52, 54, and 56 equally spaced around diffuser 46 at slip joint 48.

Figure 2:
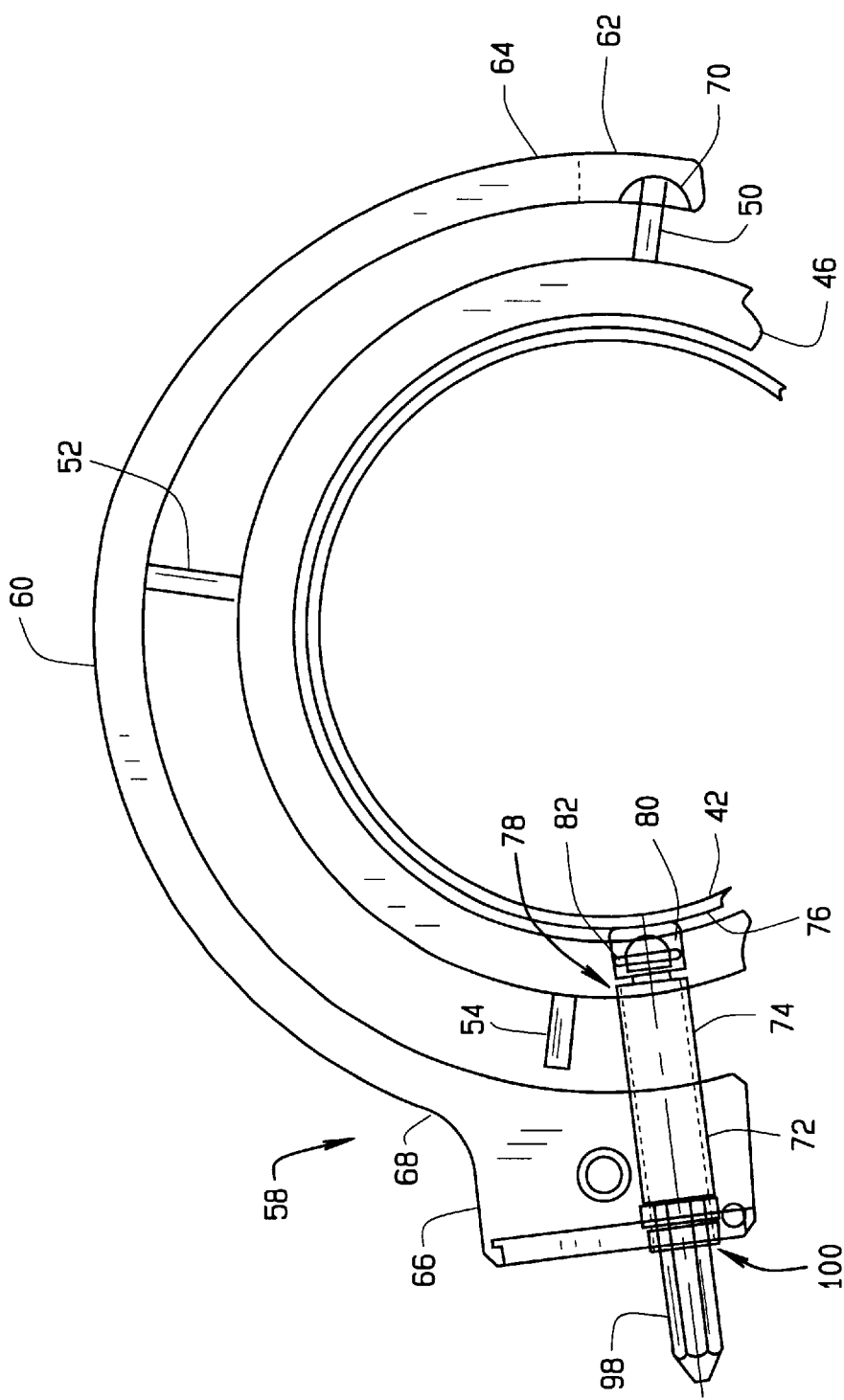
FIG. 2 is a top sectional view of a jet pump shown in FIG. 1 with a clamp assembly attached in accordance with an embodiment of the present invention.
Figure 3:
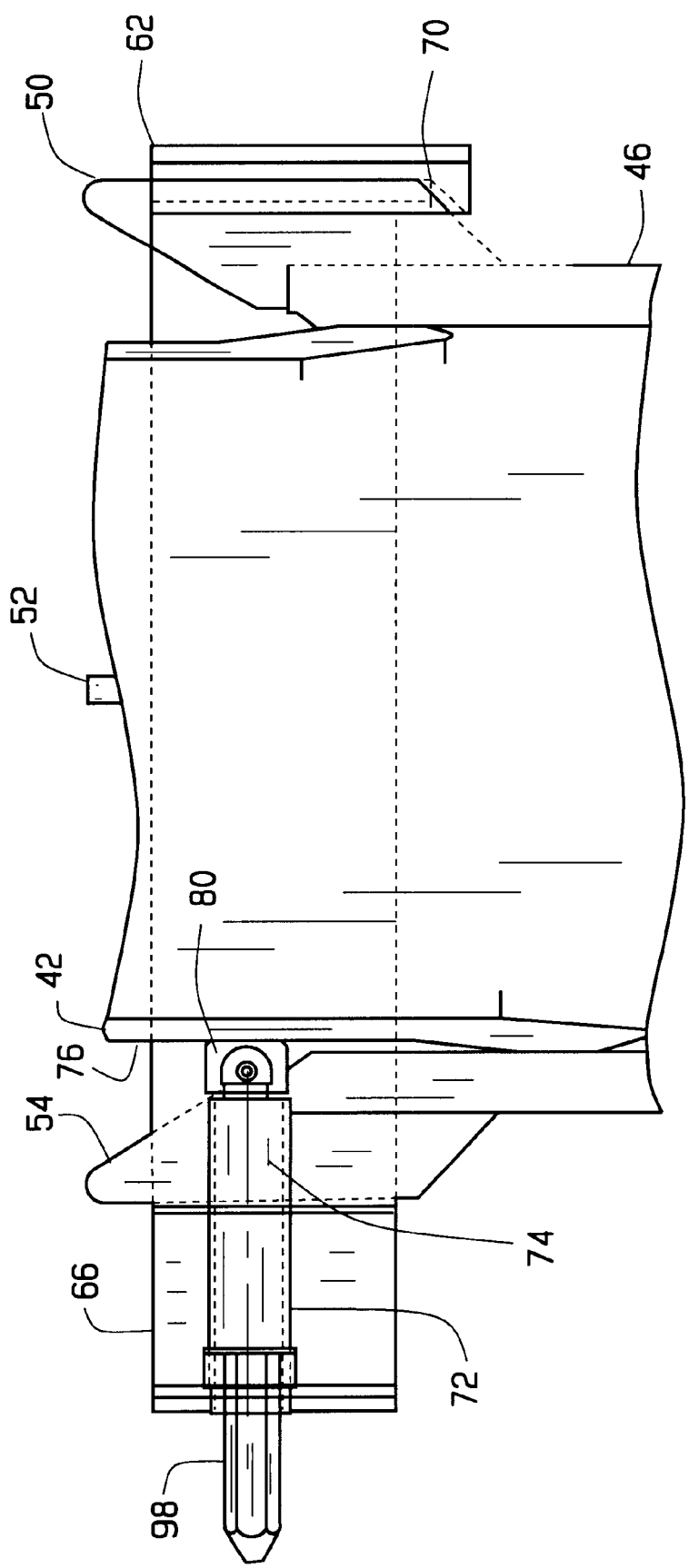
FIG. 3 is a front sectional view of the jet pump and clamp assembly shown in FIG. 2.

FIG. 2 is a top sectional view of a clamp assembly 58 attached to slip joint 48 of jet pump assembly 34 in accordance with an embodiment of the present invention. FIG. 3 is a side view of clamp assembly 58 attached to slip joint 48. Referring to FIGS. 2 and 3, clamp assembly 58 includes a curved or arcuate main portion 60, an engagement portion 62 extending from a first end 64 of main portion 60, and a locking preload portion 66 extending from a second end 68 of main portion 60. Clamp assembly 58 is substantially C-shaped.

Engagement portion 62 includes an engagement slot 70 sized to receive diffuser guide ear 50 and react a clamp preload through guide ear 50 into jet pump diffuser 46. Engagement slot 70 has a curved or radiused shape. Seating of guide ear 50 in radiused slot 70 provides a fitup that stabilizes the horizontal attitude of clamp assembly 58.

Figure 4:
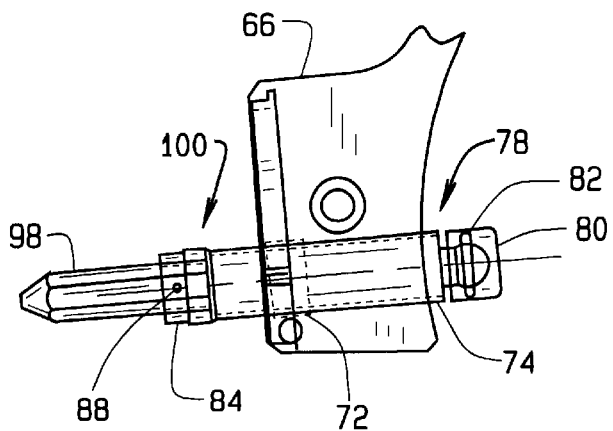
FIG. 4 is a top sectional side view of the locking preload portion of the clamp assembly shown in FIG. 2 with the clamp bolt retracted.

Referring also to FIG. 4, locking portion 66 includes a threaded clamp bolt opening 72 extending therethrough, and a clamp bolt 74 threadedly engaging and extending through clamp bolt opening 72. Clamp bolt 74 is sized to permit installation of clamp assembly 58 to slip joint 48 when retracted and engage an outer surface 76 of inlet mixer 42 when tightened. A first end 78 of clamp bolt 74 includes a swivel pad 80 to maintain the desired contact against inlet mixer 42. Swivel pad 80 is coupled to clamp bolt 74 by a first lock pin 82.

Figure 5:
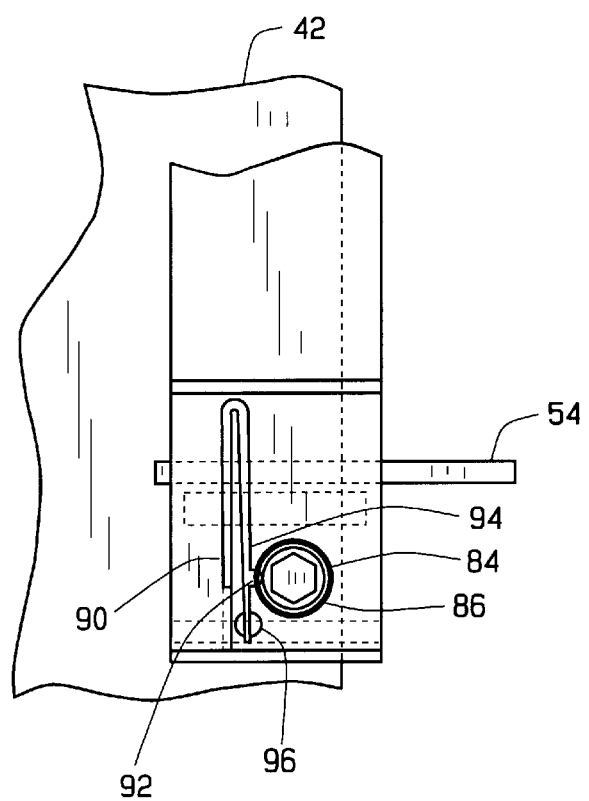
FIG. 5 is a sectional side view of the locking preload portion of the clamp assembly shown in FIG. 2.

Referring to FIG. 5, clamp bolt 74 includes a locking collar 84 and a plurality of ratchet teeth 86 spaced around the periphery of locking collar 84. Locking collar 84 is secured to clamp bolt 74 with a second lock pin 88. A locking spring 90 is coupled to locking portion 66 adjacent bolt opening 72. A retention stub 92 extends from one side 94 of locking spring 90. Retention stub 92 is sized to engage ratchet teeth 86 to lock clamp bolt 74 in place and prevent clamp bolt 74 from loosening. Locking portion 66 also includes a release opening 96 located adjacent locking spring 90. Release opening 96 is sized to receive a release tool (not shown) which moves locking spring 90 to disengage retention stub 92 from ratchet teeth 86 to enable clamp bolt 74 to be loosened. hexagonal drive extension 98 extends from a second end 100 of clamp bolt 74. Hexagonal drive extension 98 is used to tighten clamp bolt 74 to apply a predetermined preload to jet pump diffuser 46.

Clamp assembly 58 is remotely installed on slip joint 48 with clamp bolt 74 retracted. The installation of clamp assembly 58 does not require disassembly of jet pump 34. Specifically, clamp assembly 58 is positioned around slip joint 48 so that a guide ear 50 is received in engagement slot 70. Clamp bolt 74 is tightened so that bolt 774extends through clamp bolt opening 72 and into engagement with outer surface 76 of inlet mixer 42. Clamp bolt 74 is extended adjacent to guide ear 54 which is diametrically opposite guide ear 50 to capture clamp assembly 58 to jet pump 34. Tightening clamp bolt 74 applies the desired side or lateral force to inlet mixer 42. Additionally, clamp bolt 74 is located at an azimuth position offset from guide ear 54 such that a component of the preload is reacted to inlet mixer 42 by contact of main portion 60 of clamp assembly 58 with intermediate guide ear 52. This also stabilizes the horizontal attitude of clamp assembly 58 which along with the fitup between guide ear 50 and engagement slot 70 secures clamp assembly 58 from vibration. The spring preload of clamp assembly 58 acting across the diameter of inlet mixer 42 and diffuser 46 maintains rigid contact between mixer 42 and diffuser 46. Elastic deformation of main portion 60 maintains the preload while accommodating the minor thermal differential changes in the dimensions of mixer 42 and diffuser 46 during operation.

The above described clamp apparatus 58 provides a lateral load to slip joint 48 of jet pump 34 to maintain a tight and rigid contact between inlet mixer 42 and diffuser 46 to prevent oscillating motion and suppress FIV. Also, clamp apparatus 58 is remotely installable, requires minimum installation time, and does not require disassembly of jet pump 34.

While the invention has been described in terms of various specific embodiments, those skilled in the art will recognize that the invention can be practiced with modification within the spirit and scope of the claims.

What is claimed is:

1. A clamp apparatus for a jet pump slip joint in a boiling water nuclear reactor pressure vessel, the jet pump comprising a jet pump inlet mixer and a jet pump diffuser joined by a slip joint, the diffuser comprising a plurality of guide ears spaced circumferentially around the diffuser, said clamp apparatus comprising a C-yoke having a first end and a second end, said C-yoke comprising:

an engagement slot at said first end; and a clamp bolt at said second end, said clamp bolt comprising a locking collar and a plurality of ratchet teeth spaced around the periphery of said locking collar.

2. A clamp apparatus in accordance with claim 1 wherein said C-yoke further comprises:

an arcuate main portion having a first end and a second end; and an engagement portion extending from said first end of said main portion, said engagement portion comprising said engagement slot configured to receive and engage a diffuser guide ear.

3. A clamp apparatus in accordance with claim 2 wherein said C-yoke further comprises a locking preload portion extending from said second end of said main portion, said locking preload portion comprising a threaded clamp bolt opening extending therethrough, said clamp bolt threadedly engaging and extending through said clamp bolt opening, said clamp bolt configured to engage an inlet mixer.

4. A clamp apparatus in accordance with claim 3 wherein said locking portion comprises a locking spring coupled to a surface of said locking portion adjacent said bolt opening, said locking spring engaging said ratchet teeth of said locking collar.

5. A clamp apparatus in accordance with claim 1 wherein said clamp bolt further comprises a swivel pad.

6. A jet pump for a boiling water nuclear reactor, said jet pump comprising:

an inlet mixer;

a diffuser coupled to said inlet mixer by a slip joint, the diffuser comprising a plurality of guide ears spaced circumferentially around the diffuser; and a clamp apparatus comprising a C-yoke having a first end and a second end, said C-yoke comprising an engagement slot at said first end, and a clamp bolt at said second end.

7. A jet pump in accordance with claim 6 wherein said C-yoke further comprises:

an arcuate main portion having a first end and a second end; and an engagement portion extending from said first end of said main portion, said engagement portion comprising said engagement slot configured to receive and engage a diffuser guide ear.

8. A jet pump in accordance with claim 7 wherein said C-yoke further comprises a locking preload portion extending from said second end of said main portion, said locking preload portion comprising a threaded clamp bolt opening extending therethrough, said clamp bolt threadedly engaging and extending through said clamp bolt opening, said clamp bolt configured to engage the inlet mixer.

9. A jet pump in accordance with claim 8 wherein said clamp bolt comprises a locking collar and a plurality of ratchet teeth spaced around the periphery of said locking collar.

10. A jet pump in accordance with claim 9 wherein said locking portion comprises a locking spring coupled to a surface of said locking portion adjacent said bolt opening, said locking spring engaging said ratchet teeth of said locking collar.

11. A jet pump in accordance with claim 6 wherein said clamp bolt further comprises a swivel pad.

12. A method of repairing a jet pump slip joint, the jet pump comprising a jet pump inlet mixer and a jet pump diffuser joined by the slip joint, the diffuser comprising a plurality of guide ears spaced circumferentially around the diffuser, said method comprising the steps of:

coupling a clamp apparatus to the slip joint, the clamp apparatus comprising a C-yoke having a first end and a second end, the C-yoke comprising an engagement slot at the first end, and a clamp bolt at the second end.

13. A method in accordance with claim 12 wherein C-yoke further comprises an arcuate main portion having a first end and a second end, and an engagement portion extending from the first end of the main portion, the engagement portion comprising the engagement slot configured to receive and engage a diffuser guide ear.

14. A method in accordance with claim 13 wherein the C-yoke further comprises a locking portion extending from the second end of the main portion, the locking portion comprising a threaded clamp bolt opening extending therethrough, the clamp bolt threadedly engaging and extending through the clamp bolt opening.

15. A method in accordance with claim 14 wherein the clamp bolt comprises a locking collar and a plurality of ratchet teeth spaced around the periphery of the locking collar.

16. A method in accordance with claim 15 wherein the locking portion comprises a locking spring coupled to a surface of the locking portion adjacent the bolt opening, the locking spring configured to engage the ratchet teeth of the locking collar.

17. A method in accordance with claim 15 wherein coupling a clamp apparatus to the slip joint comprises the steps of:

positioning the clamp assembly around the slip joint with the engagement slot receiving and engaging a diffuser guide ear;

tightening the clamp bolt so that the clamp bolt extends through the clamp bolt opening and into engagement with an outside surface of the inlet mixer; and locking the clamp bolt.

18. A method in accordance with claim 17 wherein locking the clamp bolt comprises the step of engaging the ratchet teeth of the locking collar with the locking spring.

19. A method in accordance with claim 17 wherein the clamp bolt comprises a swivel pad and tightening the clamp bolt comprises the step of tightening the clamp bolt so that the swivel pad moves into engagement with an outside surface of the inlet mixer.

* * * * *